US012078599B2

(12) United States Patent
Cho et al.

(10) Patent No.: US 12,078,599 B2
(45) Date of Patent: Sep. 3, 2024

(54) INSPECTION METHOD BASED ON EDGE FIELD AND DEEP LEARNING

(71) Applicant: COGNEX CORPORATION, Natick, MA (US)

(72) Inventors: Hunmin Cho, Seoul (KR); Jonggyu Im, Seoul (KR); Jongkwan Park, Gyeonggi-do (KR)

(73) Assignee: COGNEX CORPORATION, Natick, MA (US)

( * ) Notice: Subject to any disclaimer, the term of this patent is extended or adjusted under 35 U.S.C. 154(b) by 590 days.

(21) Appl. No.: 17/226,697

(22) Filed: Apr. 9, 2021

(65) Prior Publication Data

US 2021/0318252 A1    Oct. 14, 2021

(30) Foreign Application Priority Data

Apr. 10, 2020    (KR) .................. 10-2020-0044073

(51) Int. Cl.
*G01N 21/88*    (2006.01)
*G06N 3/08*    (2023.01)
*G06T 7/00*    (2017.01)

(52) U.S. Cl.
CPC .......... *G01N 21/8851* (2013.01); *G06N 3/08* (2013.01); *G06T 7/0004* (2013.01);
(Continued)

(58) Field of Classification Search
CPC ....... G01N 21/8851; G01N 2021/8887; G01N 2021/8829; G01N 2021/8883;
(Continued)

(56) References Cited

U.S. PATENT DOCUMENTS 10,674,651 B2    6/2020    Kim et al.
2005/0052735 A1*    3/2005    Hoyer .................. G02B 21/14
                                                    359/368
(Continued)

FOREIGN PATENT DOCUMENTS

JP    2017227474 A    12/2017
JP    2019082333 A    5/2019
(Continued)

*Primary Examiner* — Bobbak Safaipour
(74) *Attorney, Agent, or Firm* — Brian B. Shaw, Esq.; Harter Secrest & Emery LLP

(57) ABSTRACT

Disclosed is a defect inspection device. The defect inspection device may include a lighting system designed for transmitting a lighting pattern having different illuminances for each area on a surface of an inspection object; a photographing unit for obtaining an image data of the inspection object; one or more processors for processing the image data; and a memory for storing a deep learning-based model. In addition, the one or more processors are adapted to control, the lighting system to transmit a lighting pattern having a different illuminance for each area on a surface of an inspection object, input, an image data obtained by the photographing unit into the deep learning-based model, wherein the image data includes a rapid change of illuminance in at least a part of the object surface; and determine, a defect on a surface of the inspection object using the deep learning-based model.

14 Claims, 26 Drawing Sheets

(52) U.S. Cl.
CPC .............. *G01N 2021/8887* (2013.01); *G06T 2207/20081* (2013.01); *G06T 2207/20084* (2013.01)

(58) Field of Classification Search
CPC .............. G01N 21/8806; G01N 21/01; G01N 2021/0112; G01N 2021/8809; G06N 3/08; G06N 3/084; G06T 7/0004; G06T 2207/20081; G06T 2207/20084; G06T 2207/30108
See application file for complete search history.

(56) References Cited

U.S. PATENT DOCUMENTS

| | | | | |
|---|---|---|---|---|
| 2011/0181873 | A1* | 7/2011 | Yavets-Chen | G01N 21/55 356/237.2 |
| 2019/0012579 | A1* | 1/2019 | Namiki | G06V 10/764 |
| 2019/0050614 | A1* | 2/2019 | Lei | G06K 7/1456 |
| 2019/0122012 | A1* | 4/2019 | Lei | G06K 7/1092 |
| 2019/0137266 | A1  | 5/2019 | Chang et al. | |
| 2019/0204236 | A1* | 7/2019 | Michniewicz | F21V 3/02 |
| 2019/0318469 | A1* | 10/2019 | Wang | G06N 3/08 |
| 2020/0089130 | A1* | 3/2020 | Chao | G06F 30/398 |
| 2020/0334432 | A1* | 10/2020 | Utykanski | G06K 7/0004 |
| 2021/0318565 | A1* | 10/2021 | Song | G06T 7/0004 |
| 2021/0356408 | A1* | 11/2021 | Yacoubian | B33Y 30/00 |

FOREIGN PATENT DOCUMENTS

| | | |
|---|---|---|
| JP | 2019207194 A | 12/2019 |
| KR | 10-1517929 B1 | 5/2015 |
| KR | 10-1733228 B1 | 5/2017 |
| KR | 10-2009757 B1 | 8/2019 |
| KR | 10-2020-0006028 A | 1/2020 |
| KR | 10-2019-0075707 A | 10/2020 |

* cited by examiner

INSPECTION METHOD BASED ON EDGE FIELD AND DEEP LEARNING

CROSS-REFERENCE TO RELATED APPLICATIONS

This application claims priority to and the benefit of Korean Patent Application No. 10-2020-0044073 filed in the Korean Intellectual Property Office on Apr. 10, 2020, the entire contents of which are incorporated herein by reference.

TECHNICAL FIELD

The present disclosure relates to defect inspection equipment, and more particularly, to a device for inspecting whether a surface of an inspection object is defective.

BACKGROUND ART

In the process of producing an object at a factory, the object may be defective due to machinery, process, or other reasons. In the factory, it is common to go through a procedure to check whether the object is defective before production of the object is completed and the object is released.

In recent years, in the art, in order to quickly inspect a defect of a target article by shortening a process time, a technology for determining whether an inspection object is defective by using a computer vision has been introduced.

However, since a computer vision technology in the prior art uses only a lighting system to which a diffuser plate is attached, the computer vision technology has a disadvantage in that a recognition rate of a surface defect such as a fine scratch, step, or dent deteriorates when inspecting the inspection object, which has a smooth surface, a shiny surface, or a glossy surface due to severe light scattering.

Korean Patent No. 10-1517929 (Title of the Invention: Robot Vision Device Capable of Non-stop Inspecting Object) discloses a device that photographs an inspection object by using an articulated robot disposed outside the inspection object and determines the good or bad of the inspection object from a photographed image.

SUMMARY OF THE INVENTION

The present disclosure has been made in an effort to provide an inspection device more efficiently detecting a defect of a surface of an inspection object.

An exemplary embodiment of the present disclosure provides a defect inspection device including: a lighting system designed for transmitting a lighting pattern having different illuminances for each area on a surface of an inspection object; a photographing unit for obtaining an image data of the inspection object; one or more processors for processing the image data; and a memory for storing a deep learning-based model. In addition, the one or more processors are adapted to control, the lighting system to transmit a lighting pattern having a different illuminance for each area on a surface of an inspection object, input, an image data obtained by the photographing unit into the deep learning-based model, wherein the image data includes a rapid change of illuminance in at least a part of the object surface by the transmitted lighting pattern; and determine, a defect on a surface of the inspection object using the deep learning-based model. In an alternative exemplary embodiment, the lighting system of the defect inspection device may include a plurality of light sources, and the plurality of light sources may be arranged at predetermined intervals.

In an alternative exemplary embodiment, the lighting system of the defect inspection device may include a plurality of light sources, and transmit a lighting pattern having different illuminances for each area on a surface of an inspection object by controlling an operation of each of the plurality of light sources.

In an alternative exemplary embodiment, the lighting system of the defect inspection device may include a plurality of light sources including at least two groups.

In an alternative exemplary embodiment, the lighting system of the defect inspection device may include a plurality of light sources, and when the light sources emit light, the number of edge fields per unit area on one area of the surface of the inspection object may be different from that of at least one other area.

In an alternative exemplary embodiment, the lighting pattern having different illuminances for each area transmitted by the lighting system of the defect inspection device may be configured such that an illuminance change region, where rapid change of illuminance occurs, covers at least a part of the surface of the inspection object.

In an alternative exemplary embodiment, the plurality of light sources of the lighting system may be controlled by the processor to transmit the lighting pattern having different illuminances for each area transmitted by the lighting system of the defect inspection device in a linear, polygonal, or circular pattern.

In an alternative exemplary embodiment, the processor of the defect inspection device may input a plurality of image data obtained under different lighting patterns into the deep learning based model to determine the defect of the inspection object surface.

In an alternative exemplary embodiment, the lighting system of the defect inspection device may include a plurality of lighting plates on which the plurality of light sources are arranged and the plurality of lighting plates may be manufactured in a form in which a region is perforated so that at least a portion of a light transmitted from a lighting plate located on an upper layer may reach the surface of the inspection object.

In an alternative exemplary embodiment, the processor of the defect inspection device may additionally extract an illuminance change region in which illuminance rapidly changes from the image data.

Another exemplary embodiment of the present disclosure provides a non-transitory computer readable medium storing a computer program, wherein the computer program comprising instructions for causing one or more processors to perform the method, which may include: controlling a lighting system designed to transmit different lighting patterns to transmit a lighting pattern having a different illuminance for each area on a surface of an inspection object; obtaining an image data obtained by a photographing unit into a deep learning-based model, wherein the image data includes a rapid change of illuminance in at least part of the object surface; determining a defect on the surface of the inspection object using the deep learning-based model.

Still another exemplary embodiment of the present disclosure provides a method for inspecting defect on a surface of an inspection object, which may include: controlling a lighting system designed to transmit different lighting patterns to transmit the different lighting patterns for each area on a surface of an inspection object; inputting an image data obtained by a photographing unit into a deep learning-based model, wherein the image data includes a rapid change of illuminance in at least a part of the object surface by the transmitted lighting pattern; and determining a defect on the surface of the inspection object using the deep learning-based model.

According to an exemplary embodiment of the present disclosure, an inspection device more efficiently detecting a defect of a surface of an inspection object can be provided.

DETAILED DESCRIPTION

Figure 1:
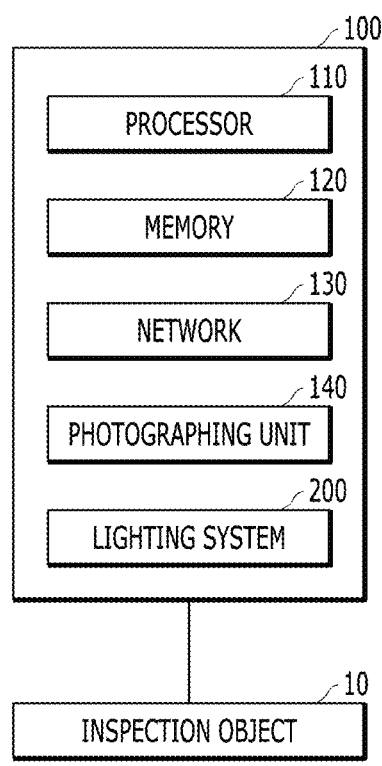
FIG. 1 is a block diagram of a defect inspection device according to an exemplary embodiment of the present disclosure.

Various exemplary embodiments will now be described with reference to drawings and like reference numerals are used to refer to like elements throughout all drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside in the processor and/or the execution thread and one component may be localized in one computer or distributed among two or more computers. Further, the components may be executed by various computer-readable media having various data structures, which are stored therein. The components may perform communication through local and/or remote processing according to a signal (for example, data from one component that interacts with other components and/or data from other systems through a network such as the Internet through a signal in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

Those skilled in the art need to additionally recognize that various illustrative logical blocks, configurations, modules, circuits, means, logic, and algorithm steps described in connection with the exemplary embodiments disclosed herein may be implemented as electronic hardware, computer software, or combinations of both sides. To clearly illustrate the interchangeability of hardware and software, various illustrative components, blocks, constituents, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be interpreted within the widest range which is coherent with the principles and new features presented herein.

In the present disclosure a high diffusion degree of light transmitted to an object means a state in which transparency of a dynamic diffuser is low. That is, the high diffusion degree of the light transmitted to the object means that the light reaches the object while being scattered. On the contrary, a low diffusion degree of the light transmitted to the object means a state in which the transparency of the dynamic diffuser is high. That is, the low diffusion degree of the light transmitted to the object means that the light is hardly scattered or light which starts from a light source reaches the object as it is. In other words, in the present disclosure, a defect inspection device controls the diffusion degree of the light transmitted to the object by controlling the transparency or arrangement of the dynamic diffuser.

Hereinafter, a configuration of a defect inspection device according to an exemplary embodiment of the present disclosure will be described with reference to FIG. 1.

FIG. 1 is a block diagram of a defect inspection device for determining whether an inspection object is anomaly according to an exemplary embodiment of the present disclosure. The defect inspection device 100 may include a processor 110, a memory 120, a network 130, a photographing unit 140, and a lighting system 200.

The configuration of the defect inspection device 100 illustrated in FIG. 1 is only an example illustrated through simplification. In an exemplary embodiment of the present disclosure, the defect inspection device 100 may include other components for inspecting whether a surface of the inspection object is defective, and only some of the disclosed components may constitute the defect inspection device 100.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 120 to perform data processing for machine learning according to an exemplary embodiment of the present disclosure. According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

According to an exemplary embodiment of the present disclosure, the memory 120 may store any type of information generated or determined by the processor 110 or any type of information received by the network 130.

According to an exemplary embodiment of the present disclosure, the memory 120 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device may operate in connection with a web storage performing a storing function of the memory 120 on the Internet. The description of the memory is just an example and the present disclosure is not limited thereto.

The network 130 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

The network 130 presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network 130 may be configured regardless of communication modes such as wired and wireless modes and constituted by various communication networks including a personal area network (PAN), a wide area network (WAN), and the like. Further, the network may be known World Wide Web (WWW) and may adopt a wireless transmission technology used for short-distance communication, such as infrared data association (IrDA) or Bluetooth.

The techniques described in this specification may also be used in other networks in addition to the aforementioned networks.

The detect inspection device 100 according to an exemplary embodiment of the present disclosure is implemented by components to be described below to inspect the defect of an inspection object 10. The inspection object 10 is not the component of the defect inspection device 100, but is an auxiliary component for describing the configuration or an operation of the defect inspection device.

The defect inspection device 100 may include the lighting system, 200 and the processor 110. The lighting system 200 may include a light source for radiating light to the inspection object and a dynamic diffuser 300 which is located between the light source and the inspection object 10 and is capable of controlling a diffusion degree of light transmitted to the inspection object. The processor 110 may control the dynamic diffuser based on characteristics of the inspection object 10.

The processor 110 controls the dynamic diffuser based on the characteristics of the inspection object 10, which include all of characteristics of an object surface (e.g., texture, material, color, glossiness, etc.) and characteristics selected by a user. For example, the processor 110 may determine the transparency of the dynamic diffuser required for inspection from image data on the object surface. As another exemplary embodiment, the processor 110 may control the dynamic diffuser according to a predetermined control scheme or a predetermined series of control sequences for the objects having the characteristics selected by the user. Specifically, the processor may control the dynamic diffuser so as to inspect both a state in which a diffusion degree of the light transmitted to the object by the dynamic diffuser is low and a state in which the diffusion degree is high in order to increase a defect detection rate for expensive products of which sales cost exceeds a specific value. In this case, the characteristics selected by the user may be the price of the product. The above-described characteristics are just an example and the present disclosure is not limited thereto.

Throughout this specification, an edge field is a term for referring to a portion in which illuminance of light irradiated to the object surface by an image of the light source changes when the image of the light source is condensed and shined on the surface of the inspection object. The edge field as a word defined in this specification to correspond to a dark field or a light field used in an optical system refers to an area within a predetermined distance from a lightest center of the light source when the image of the light source of the lighting is condensed and shined on the surface of the inspection object.

Figure 2:
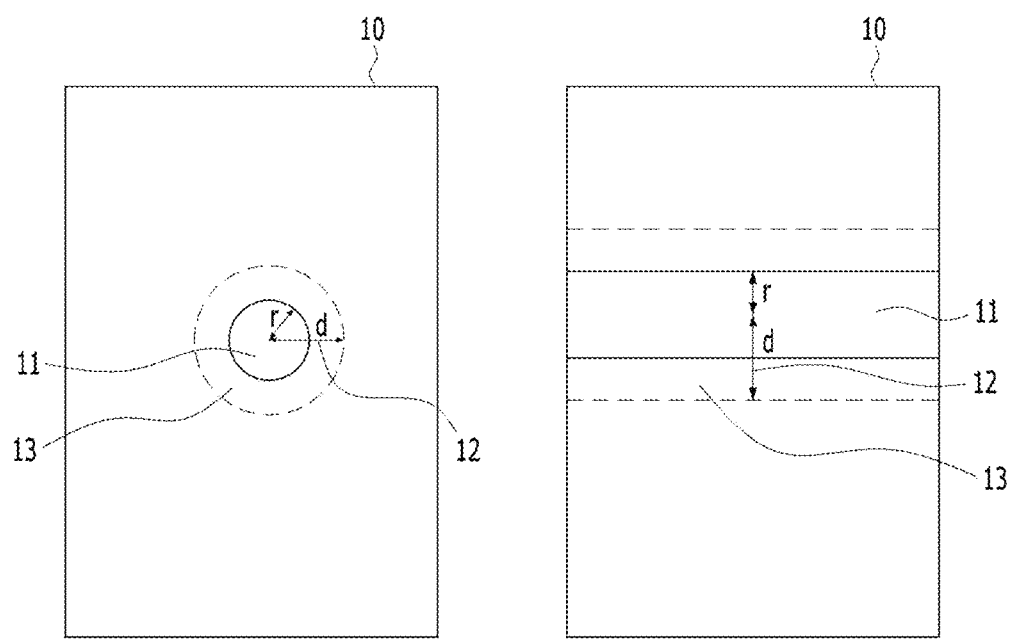
FIG. 2 is a diagram illustrating an example for describing a concept of an edge field defined in the present disclosure.

Hereinafter, a concept of the edge field will be additionally described with reference to FIG. 2.

A predetermined distance d (reference numeral 12) of the edge field is configured to include a wider area than a light source area 11 in which the image of the light source is condensed and shined on the surface of the inspection object 10. That is, the edge field may be determined to partially include the light source area 11 having higher illuminance than other areas as direct shining of the light source and an area 13 having relatively low illuminance, which is other than a part to which the light source is directly shined. The light source area 11 on which the image of the light source is condensed and shined means a shape of the light source when the shape of the light source itself, which transmits the light appears on the surface of the inspection object as it is according to the characteristics of the surface of the inspection object. The shape of the light source includes, for example, a circular light source shape, a linear light source shape, a polygonal light source shape, etc., according to a form of the light source, but the present disclosure is not limited thereto and includes all light sources having specific shapes.

In conclusion, the edge field refers to a total area including the light source area 11 and an area 13 having relatively low illuminance, which exists in an area separated from the center of the light source by the predetermined distance d (reference numeral 12).

The predetermined distance of the edge field may be determined to be large or small according to the characteristics of the inspection object, selection of the user, etc. For example, when the inspection object does not allow even any small scratch or dent, the processor 110 sets the predetermined distance of the edge field to be small and transmits the light very densely to inspect the surface of the inspection object. On the contrary, in the case of an inspection process having relatively low importance or when it is sufficient only by inspecting defects having a predetermined size or more, the processor 110 may set the predetermined distance of the edge field to be larger. The description of the range of the edge field described above is just an example and the present disclosure is not limited thereto.

In this specification, a "region including a rapid change of illuminance" is used as the same meaning as a "region including at least one edge field".

Hereinafter, a reason of introducing the concept of the edge field will be described with reference to FIGS. 3A, 3B, 3C, and 3D.

Figure 3A:
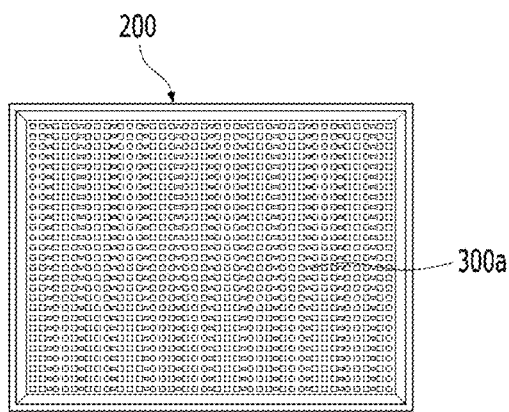
FIGS. 3A and 3B illustrate examples of a dynamic diffuser and a lighting system according to an exemplary embodiment of the present disclosure.
Figure 3B:
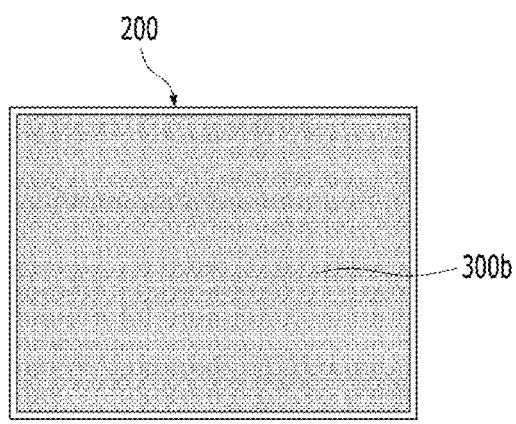
Figure 3C:
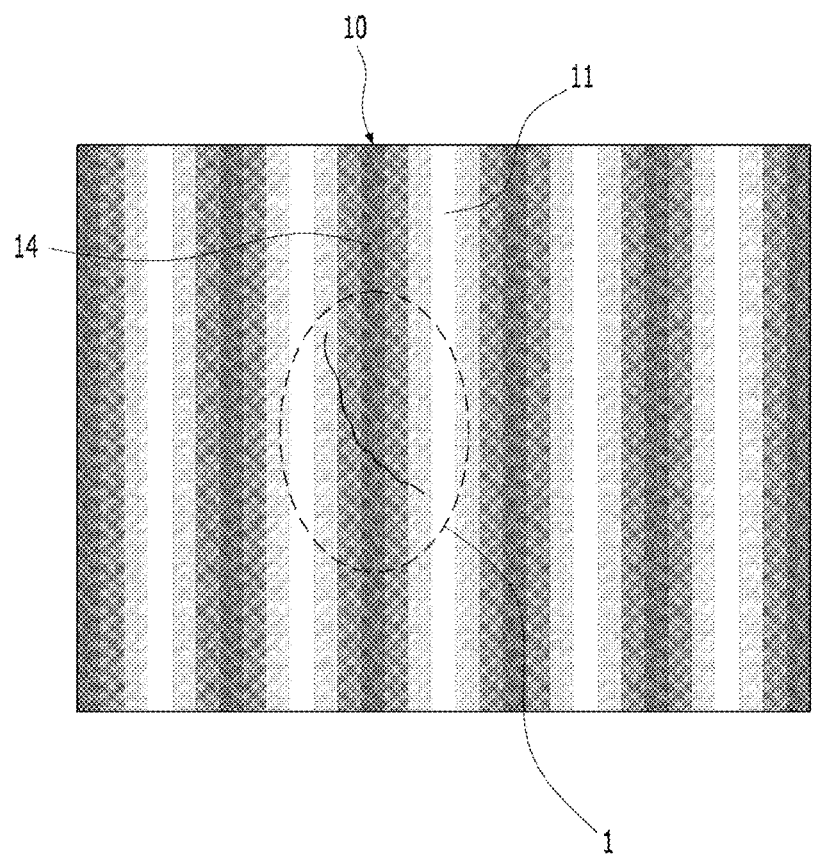
FIGS. 3C and 3D are schematic views of light transmitted to a surface of an inspection object depending on an operation state of the dynamic diffuser according to an exemplary embodiment of the present disclosure.
Figure 3D:
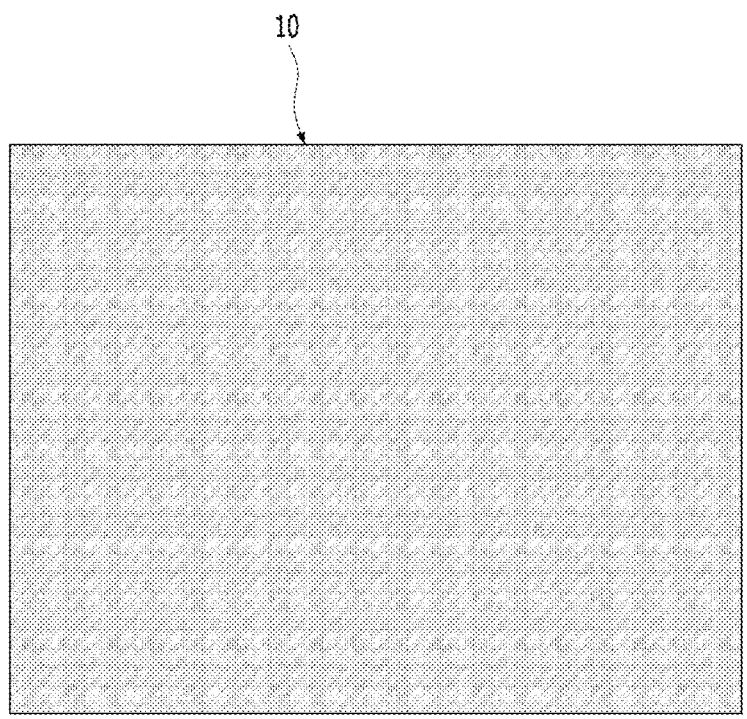

In general, in the art, in order to observe the surface of the inspection object, the defect of the object is inspected while the diffusion degree of the light transmitted to the inspection object 10 is controlled to be high by attaching a diffuser to a lighting plate of the lighting system 200 (300b) (see FIG. 3B). That is, light having predetermined illuminance is transmitted to the entirety of the surface of the inspection object 10 (see FIG. 3D). The reason is that when there is the light source area 11 in which the image of the light source is directly condensed on the surface of the inspection object 10, the surface may not be uniformly observed due to different illuminance for each area, in general.

However, on a surface made of a shiny and glossy material, a surface of a metal frame, or the surface of the inspection object 10 that specularly reflects incident light at a specific angle, such as a mirror surface, when detecting appearance defects including scratches, steps, and dents, etc., the visibility increases in an edge field optical system (see FIG. 3A) where there is no diffuser or the transparency of the diffuser is high. That is, when the lighting is transmitted so that the light source area and the dark area 14 are shown to cross on the surface of the inspection object 10 in a state 300a in which the diffusion degree of the light transmitted to the inspection object 10 is controlled to be low, a surface defect 1 which may not be easily detected when there is the diffuser may be detected (see FIG. 3C).

A reason that the defect inspection device 100 according to an exemplary embodiment of the present disclosure controls the dynamic diffuser based on the characteristics of the inspection object 10 is that a surface defect detection probability increases when the edge field optical system (see FIG. 3A) in which the light transmitted to the inspection object is not diffused as described above and the general optical system (see FIG. 3B) in which the light transmitted to the inspection object is diffused are properly used according to the surface of the inspection object.

In the dynamic diffuser 300 included in the lighting system 200 of the defect inspection device 100 according to an exemplary embodiment of the present disclosure, the transparency is controlled by an electric signal of the processor, and as a result, the diffusion degree of the light passing through the dynamic diffuser 300 may be controlled. The dynamic diffuser 300 included in the lighting system 200 of the defect inspection device 100 may include a liquid crystal film of which transparency is controlled according to the electric signal. According to another exemplary embodiment of the present disclosure, an arrangement state of the dynamic diffuser 300 included in the lighting system 200 of the defect inspection device 100 is controlled according to a control signal of the processor to control the diffusion degree of the light transmitted to the inspection object 10.

Figure 4:
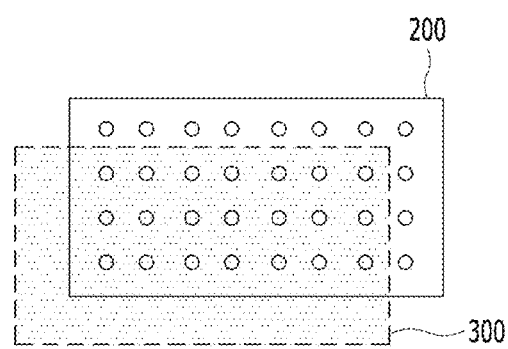
FIG. 4 is a diagram illustrating a configuration of a lighting system applied to a defect inspection device according to an exemplary embodiment of the present disclosure.

FIG. 4 illustrates the lighting plate and the dynamic diffuser 300 of the lighting system 200 included in the defect inspection device 100 according to an exemplary embodiment of the present disclosure.

In order to control the diffusion degree of the light transmitted to the inspection object 10, the dynamic diffuser 300 may be controlled by a scheme of controlling the transparency by the electric signal of the processor 110. In order to control the diffusion degree of the light transmitted to the inspection object 10, the dynamic diffuser 300 may be controlled by a scheme of changing the arrangement by the electric signal of the processor 110.

The transparency of the dynamic diffuser 300 included in the lighting system 200 of the defect inspection device 100 is changed according to applied voltage, and as a result, the diffusion degree of the light passing through the dynamic diffuser 300 may be controlled.

Figure 5:
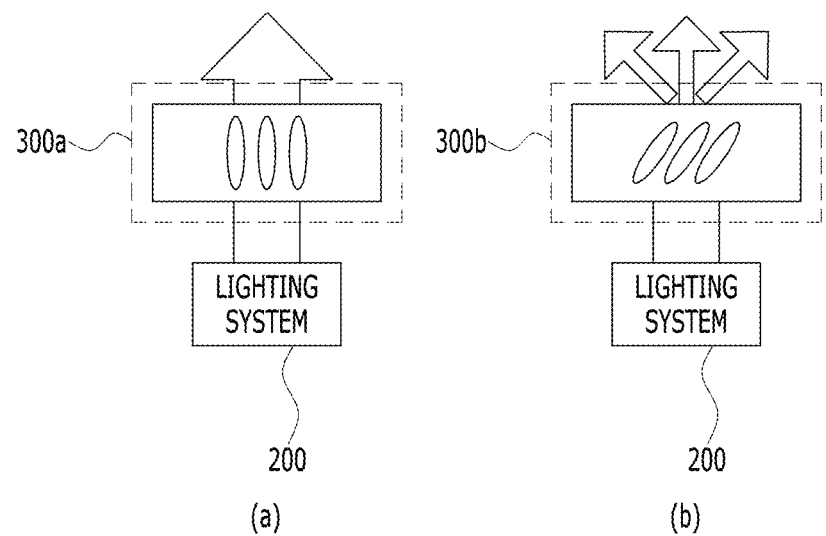
FIG. 5 is a diagram illustrating a diffusion degree of light depending on transparency of the dynamic diffuser according to an exemplary embodiment of the present disclosure.
Figure 6:
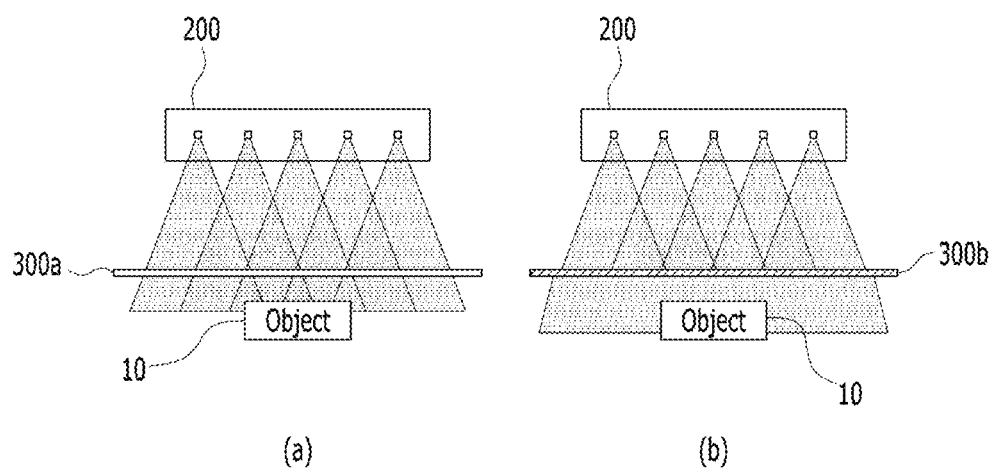
FIG. 6 is a diagram illustrating a method for controlling, by a processor, a diffusion degree of light by controlling transparency of a dynamic diffuser according to an exemplary embodiment of the present disclosure.

Hereinafter, the dynamic diffuser 300 will be described with reference to FIGS. 5 and 6. In a state 300*a* in which the diffusion degree of the light transmitted to the inspection object is controlled to be low by applying voltage to the dynamic diffuser 300, respective liquid crystal molecules in a liquid crystal of the dynamic diffuser may be arranged in parallel to a progress route of the light. In this case, the light transmitted from the lighting plate maintains a progress direction of the light when passing through the dynamic diffuser 300 to reach the inspection object 10 as it is. That is, since the light passes through the dynamic diffuser in a state in which the transparency of the dynamic diffuser is high, the diffusion degree of the light is low. On the contrary, in a state 300*b* in which the voltage is not applied to the dynamic diffuser 300 and the diffusion degree of the light transmitted to the inspection object 10 is controlled to be high, the respective liquid crystal molecules in the liquid crystal of the dynamic diffuser may be randomly arranged in an arbitrary direction. In this case, the diffusion degree of the light that is transmitted from the lighting plate and passes through the liquid crystal molecules increases, and as a result, the light is scattered before reaching the inspection object 10. That is, since the light passes through the dynamic diffuser in a state in which the transparency of the dynamic diffuser is low, the diffusion degree of the light is high.

The dynamic diffuser 300 in which the diffusion degree of the light is controlled according to the electric signal may be made of a material of which transparency is controlled by the electric signal. For example, as the material of the dynamic diffuser, an LCD film, a polymer dispersion liquid crystal film (PDLC film), etc., may be used. The above-described material of the dynamic diffuser is just an example and the present disclosure is not limited thereto.

The dynamic diffuser 300 included in the lighting system 200 of the defect inspection device 100 according to an exemplary embodiment of the present disclosure may be controlled by a scheme of controlling a 3D spatial arrangement according to the electric signal of the processor 110.

Figure 7:
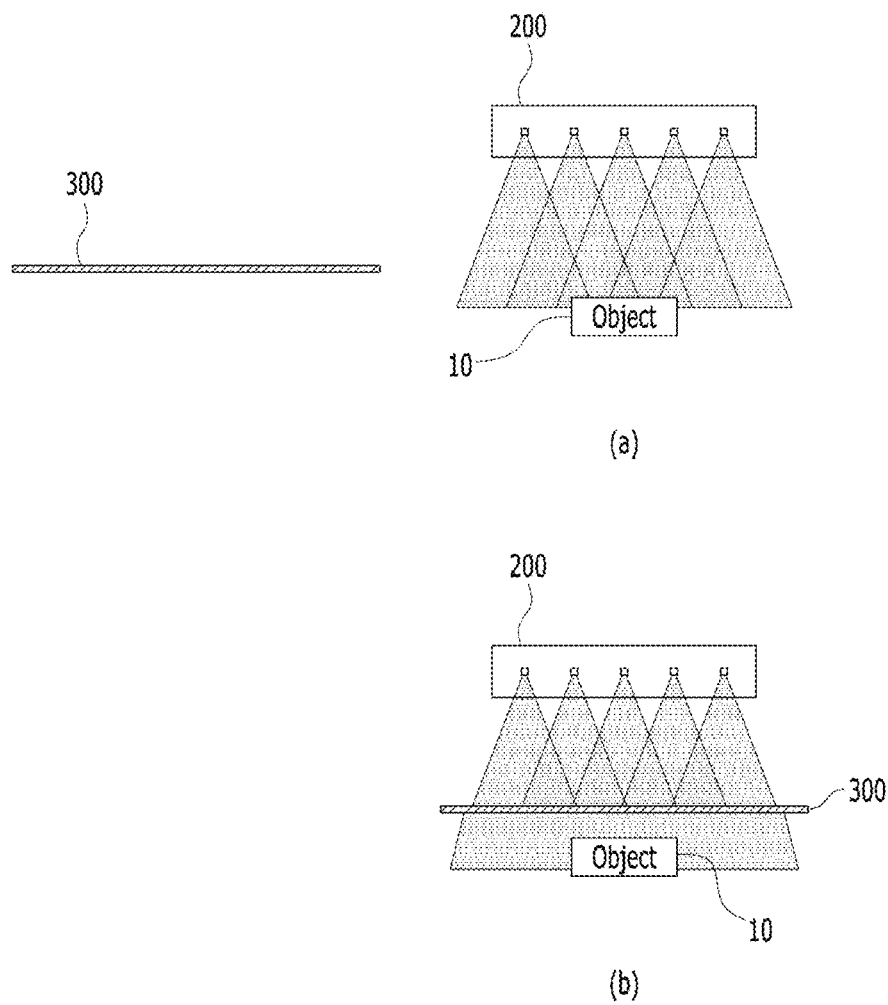
FIG. 7 is a diagram illustrating a method for controlling, by a processor, a diffusion degree of light by controlling arrangement of a dynamic diffuser according to another exemplary embodiment of the present disclosure.

Hereinafter, the dynamic diffuser 300 will be described with reference to FIG. 7. FIG. 7 is a diagram illustrating an example of controlling a spatial arrangement of the dynamic diffuser 300 by a 'sliding' scheme.

FIG. 7A illustrates an example in which the arrangement of the dynamic diffuser is changed in order for the dynamic diffuser 300 to maintain the diffusion degree of the light transmitted to the inspection object 10 to be low by the electric signal of the processor. FIG. 7B illustrates an example in which the dynamic diffuser is located between the light source and the inspection object in order for the dynamic diffuser 300 to increase the diffusion degree of the light transmitted to the inspection object 10 by the electric signal of the processor. In this case, the transparency of the dynamic diffuser 300 may be appropriately selected differently according to the inspection object 10.

The method for changing the spatial arrangement of the dynamic diffuser described in FIG. 7 above is just an example and the present disclosure includes a method for changing the spatial arrangement of the dynamic diffuser 300 and an inspection device in order to control the diffusion degree of the light transmitted to the inspection object without a limit.

In general, in the art, inspection equipment to which the diffuser is attached is used to inspect manufactured objects. However, as described above, in the case of an inspection object having a glossy surface characteristic and an inspection object having a matte surface characteristic, whether the diffuser is required to detect the surface defects may be different. However, if the user has to detach the diffuser by himself/herself depending on whether the diffuser is used for each product produced, a large cost and time are required. Therefore, according to the present disclosure, the diffusion degree of the light may be actively controlled through the dynamic diffuser 300, thereby reducing production cost and time. Furthermore, since the processor may control the transparency of the dynamic diffuser in real time, it is possible to inspect various products using one defect inspection device according to the present disclosure, thereby achieving an economic advantage.

The dynamic diffuser 300 included in the lighting system 200 of the defect inspection device 100 according to an exemplary embodiment of the present disclosure may differently control the diffusion degree of light transmitted for each area of the surface of an object by the control signal of the processor 110.

Figure 8:
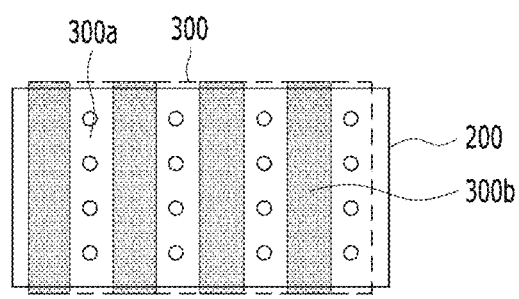
FIG. 8 is a diagram illustrating an example in which a dynamic diffuser used in a defect inspection device is controlled for each area according to an exemplary embodiment of the present disclosure.

In order to control the diffusion degree of the light transmitted to the inspection object 10, in the case of the dynamic diffuser 300 of which transparency is controlled by using the electric signal of the processor 110, the transparency of the dynamic diffuser 300 may be controlled differently for each area. For example, as illustrated in FIG. 8, the processor 110 may divide the dynamic diffuser 300 into one area in the state 300*a* in which the diffusion degree of the light transmitted to the inspection object 10 is controlled to be low and the other area in the state 300*b* in which the diffusion degree of the light transmitted to the inspection object 10 is controlled to be high, and control the dynamic diffuser 300 for each area. A meaning that the pr7ocessor 110 controls the dynamic diffuser 300 for each area is a meaning that the transparency of at least one area and the other area of the dynamic diffuser 300 may be differently controlled. The number of areas controlled at different transparency from the at least one area may be plural. The processor 110 may control the dynamic diffuser 300 to have a specific pattern in controlling the dynamic diffuser 300 for each area. The specific pattern may be a vertical line, a horizontal line, a diagonal line, a circle, or a polygon. In order to control the specific pattern, the dynamic diffuser 300 may be constituted by a set of a plurality of individual dynamic diffusers. The pattern for each area is just an example and the present disclosure is not limited thereto, but the dynamic diffuser is controlled even with any pattern to control the diffusion degree of light transmitted to a desired surface of the inspection object. According to the transparency control for each area of the dynamic diffuser 300 described above, a transparent state of the dynamic diffuser 300 required according to the surface of the inspection object 10 may be configured for each area at once, and as a result, there is an advantage in that an inspection speed increases.

In order to control the diffusion degree of the light transmitted to the inspection object 10, when the processor 110 controls an arrangement state of the dynamic diffuser, the processor may locate the dynamic diffuser 300 only between the light source and a partial area of the inspection object. When the dynamic diffuser is located only between the light source and the partial area, light having a high diffusion degree may be transmitted to the partial area and light having a low diffusion degree may be transmitted to the other area.

The defect inspection device 100 according to an exemplary embodiment of the present disclosure may include a photographing unit for obtaining image data. The processor recognizes the surface characteristics of the inspection object through the image data obtained from the photographing unit to determine the diffusion degree of the light transmitted to the inspection object based on the recognized object, thereby controlling the dynamic diffuser 300.

Figure 9:
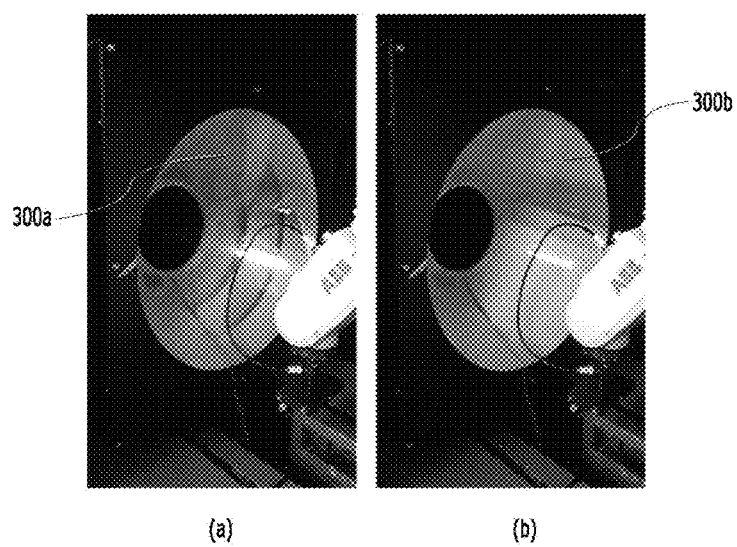
FIG. 9 is a diagram illustrating transparency which is changed when a processor controls the transparency of a dynamic diffuser according to an exemplary embodiment of the present disclosure.

FIG. 9 illustrates the dynamic diffuser 300 made of the LCD film included in the defect inspection device 100 according to an exemplary embodiment of the present disclosure. FIG. 9A illustrates the state 300a in which the diffusion degree of the light transmitted to the inspection object 10 is controlled to be low. FIG. 9B illustrates the state 300b in which the diffusion degree of the light transmitted to the inspection object 10 is controlled to be high.

Figure 10A:
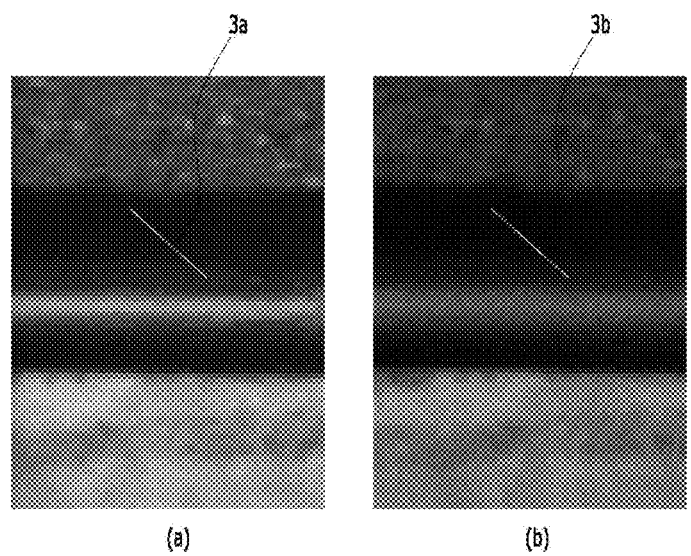
FIGS. 10A and 10B are diagrams illustrating a change in visibility of a dark area of a surface of an inspection object depending on transparency of a dynamic diffuser.
Figure 10B:
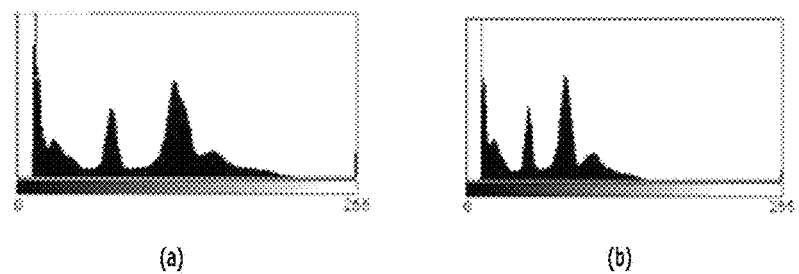

Hereinafter, an example of determining the diffusion degree of the light transmitted to the inspection object based on the recognized object will be described with reference to FIGS. 10A and 10B. FIG. 10A(a) illustrates a case where the processor 110 controls the dynamic diffuser 300 to control the diffusion degree of the light transmitted to the inspection object 10 to be low. On the contrary, FIG. 10A(b) illustrates a case where the processor 110 controls the dynamic diffuser 300 to control the diffusion degree of the light transmitted to the inspection object 10 to be high. Each of reference numerals 3a and 3b of FIG. 10A means the same line on the same inspection object surface. An illuminance distribution for the dark field of the inspection object surface measured according to the line is illustrated in FIG. 10B. That is, when the illuminance distribution is measured according to a line segment at the same position of the dark field which is one area of the inspection object, it can be seen that the illuminance is more evenly distributed in the case of measuring the illuminance distribution according to the part 3a displayed on the image data in the state in which the diffusion degree of the light transmitted to the inspection object 10 is controlled to be low (see FIG. 10B(a)) than in the case of measuring the illuminance distribution according to the part 3b displayed on the image data in the state in which the diffusion degree of the light transmitted to the inspection object 10 is controlled to be high (see FIG. 10B(b)). The even illuminance distribution means that division of the area is subdivided as much, which improves the image quality of the image data for the dark field, thereby increasing efficiency of appearance defect detection.

In an exemplary embodiment of the present disclosure, the processor 110 recognizes the inspection object from the image data obtained through the photographing unit and determines the diffusion degree of the light transmitted to the inspection object 10 based on reflectivity of the light transmitted to the inspection object 10 to control the dynamic diffuser.

The reflectivity of the object surface based on the processor may include a surface of the object made of the smooth material or the glossy material, which reflects most of incident light, a surface which is made of a matte material to reflect a portion of the incident light and absorbs the rest portion, and a surface which is made of a transparent material, which allows most of the incident light to pass through.

Hereinafter, exemplary embodiments of the present disclosure will be described with reference to FIGS. 11 to 16.

FIGS. 11 to 16 are diagrams illustrating each obtained image data according to the diffusion degree of the light when the diffusion degree of the light is controlled by the dynamic diffuser according to an exemplary embodiment of the present disclosure. In FIGS. 11 to 16, a left image (symbol (a) in the figure) of each figure illustrates image data photographed under an environment in which the diffusion degree of the light transmitted to the inspection object 10 is controlled to be low by the dynamic diffuser 300 and a right image (symbol (b) in the figure) of each figure illustrates an example of image data photographed under an environment in which the diffusion degree of the light transmitted to the inspection object 10 is controlled to be high by the dynamic diffuser 300. As described in the exemplary image data, by controlling the diffusion degree of the light of the dynamic diffuser, a possibility of identification of a defect portion expressed in a box shape in each figure may be different. The defect inspection device 100 according to an exemplary embodiment of the present disclosure may control the diffusion degree of the light transmitted to the inspection object by controlling the dynamic diffuser so as to increase the identification possibility of the defect according to the surface characteristics of the inspection object, the defect characteristics of the inspection object, etc.

Each of FIGS. 11A, 12A, 13A, 14A, 15A, and 16A illustrates a case where the transparency of the dynamic diffuser is controlled to be high and each of FIGS. 11B, 12B, 13B, 14B, 15B, and 16B illustrates a case where the transparency of the dynamic diffuser is controlled to be low.

Figure 11:
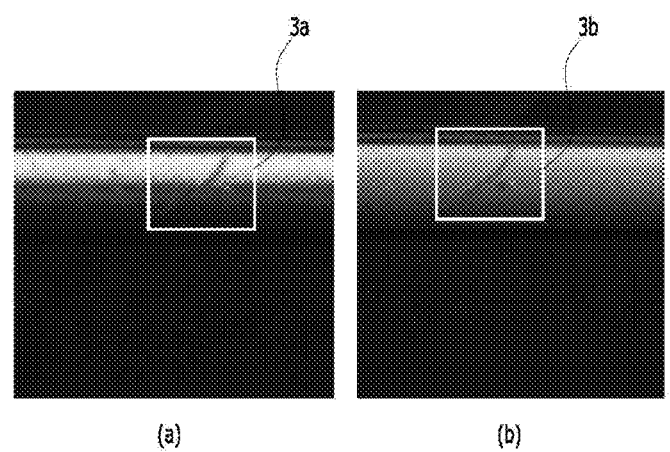
FIGS. 11, 12, 13, 14, 15, and 16 are diagrams illustrating control of transparency of a dynamic diffuser depending on characteristics of a surface of an inspection object and the resulting acquired image data according to an exemplary embodiment of the present disclosure.

FIG. 11 is a diagram illustrating a difference depending on the diffusion degree of the transmitted light when the surface of the inspection object is made of the glossy material. In the case of FIG. 11A, referring to the marked part 3a, there is an advantage in that a portion of the scratch which is the surface defect may be clearly seen and referring to the marked part 3b of FIG. 11B, there is an advantage in that a total shape of the scratch may be seen.

Figure 12:
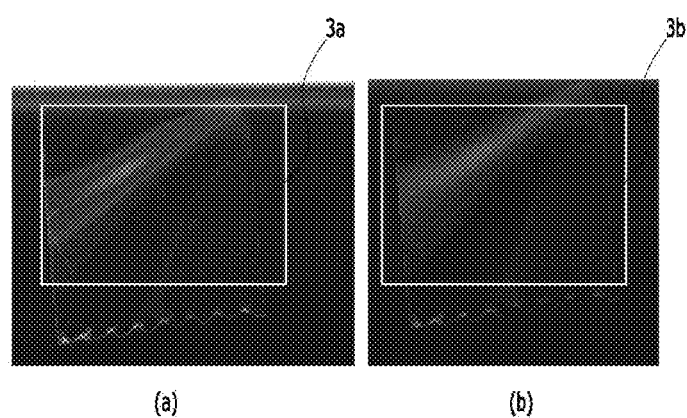

FIG. 12 is a diagram illustrating the difference depending on the diffusion degree of the transmitted light when the inspection object is made of the transparent material. Referring to the marked portion 3a of FIG. 12A, it can be known that the scratch which exists on the transparent inspection object surface may be more clearly seen than the marked portion 3b at the same location of the photographed image data in FIG. 12B.

Figure 13:
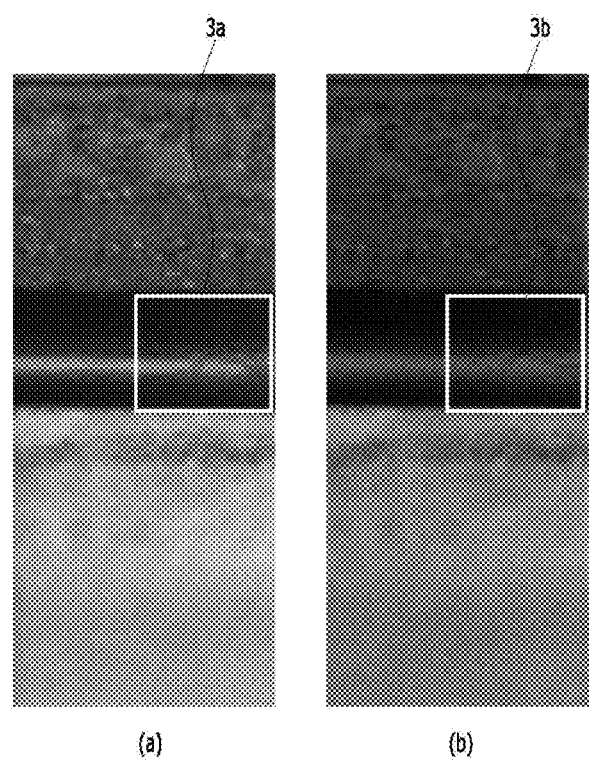

FIG. 13 illustrates image data when glue made of the transparent material is adhered to the inspection object during a manufacturing process. The marked portion 3a in FIG. 13A which is the state in which the diffusion degree of the transmitted light is low indicates the glue which exists on the inspection object surface. Referring to the marked portion 3b at the same location in FIG. 13B which is the state in which the diffusion degree of the transmitted light is high, it can be seen that the defect of the surface may be more easily seen in FIG. 13A in which the diffusion degree is low.

Figure 14:
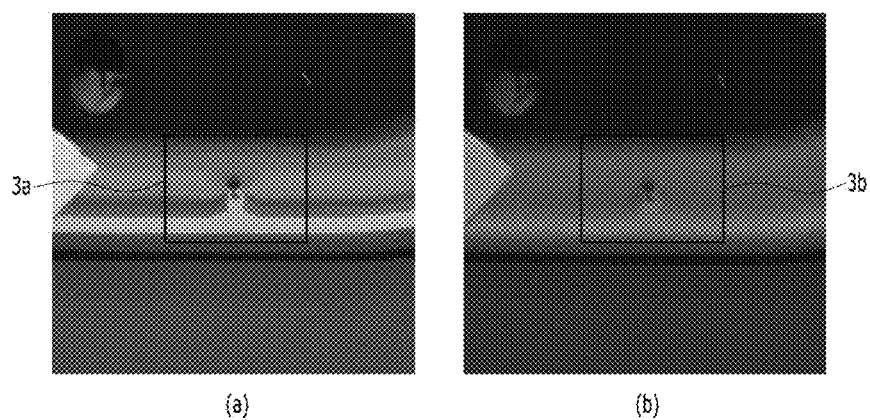

FIG. 14 illustrates exemplary image data when the defect of the dent exists on the surface of the inspection object 10. It can be seen that the change of the light around the defect is severer in the marked portion 3a in the image data (see FIG. 14A) photographed in the state in which the diffusion degree of the transmitted light is low than in the same marked portion 3b of the image data (see FIG. 14B) photographed in the state in which the diffusion degree of the transmitted light is high.

Figure 15:
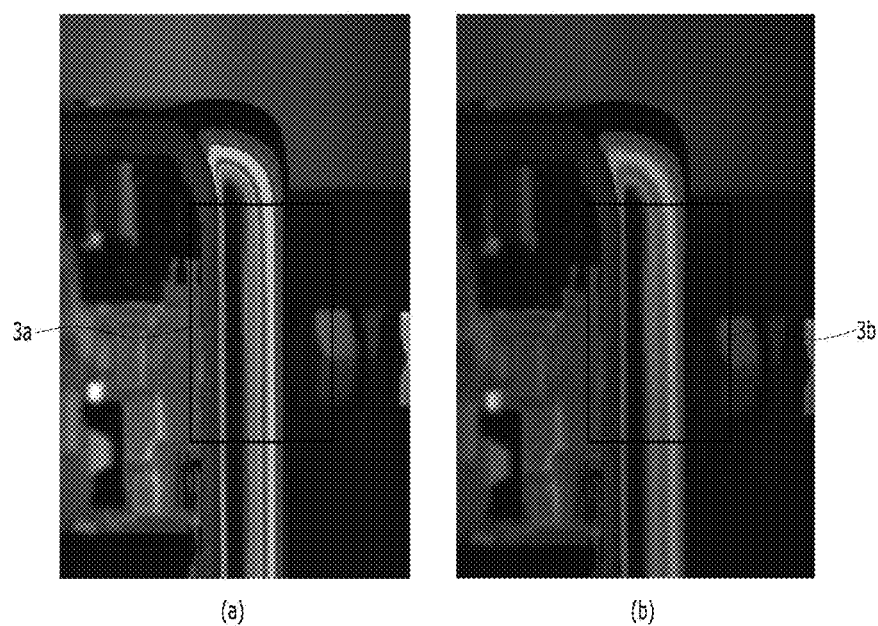

FIG. 15 illustrates a state in which there is a defect in which a curvature of the surface of the inspection object 10 is not constant. The image data for the defect portion may be more clearly acquired in the marked portion 3a in the image data (see FIG. 15A) photographed in the state in which the diffusion degree of the transmitted light is low than in the same marked portion 3b of the image data (see FIG. 15B) photographed in the state in which the diffusion degree of the transmitted light is high.

Figure 16:
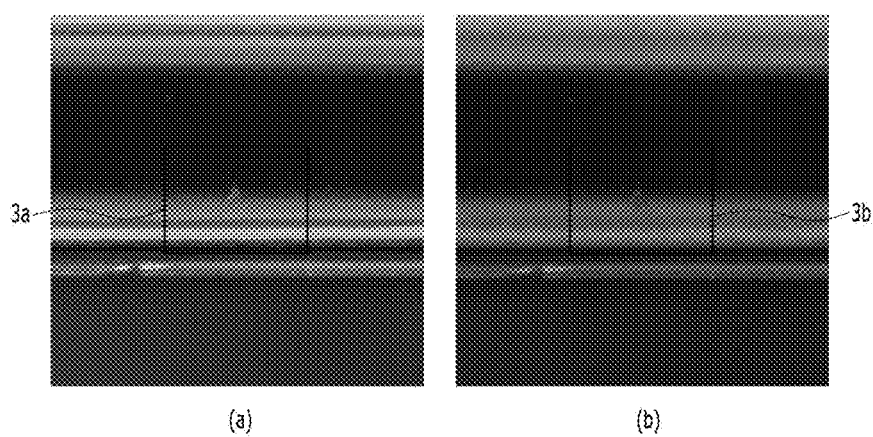

FIG. 16 illustrates a case in which there is a defect of a peculiar shape on the surface of the inspection object 10. Image data for the defect portion may be acquired, which has a higher resolution in the marked portion 3a in the image data (see FIG. 16A) photographed in the state in which the diffusion degree of the transmitted light is low than in the same marked portion 3b of the image data (see FIG. 16B) photographed in the state in which the diffusion degree of the transmitted light is high.

The examples illustrated in FIGS. 11 to 16 are just examples and the present disclosure is not limited thereto.

As described above, the diffusion degree of the light required for efficient inspection varies depending on the surface state of the inspection object 10. The defect inspection device according to the present disclosure has an advantage in that the transparency of the dynamic diffuser is controlled through the processor to actively control the reflectivity of the light in real time by considering the reflectivity of the light on the surface of the inspection object.

In an exemplary embodiment of the present disclosure, the processor 110 recognizes the inspection object 10 and when the diffusion degree of the light required in at least one area of the surface of the inspection object is different from that in the other area, the processor 110 may control the dynamic diffuser 300 for each area. Alternatively, the processor 110 recognizes the inspection object 10 and when the diffusion degree of the light required in at least one area of the surface of the inspection object is different from that in the other area, the processor 110 may control the dynamic diffuser 300 to have at least different two transparencies. In this case, in order to control the dynamic diffuser 300 for each area, the dynamic diffuser may be constituted by a set of a plurality of dynamic diffusers which are individually controlled. For example, when the area of the surface of the inspection object recognized by the processor 110 is a cellular phone liquid crystal having the glossy material and a cellular phone bezel having the matte material, the diffusion degree of the light is decreased by increasing the transparency of the dynamic diffuser in one area of the inspection object corresponding to the liquid crystal and the diffusion degree of the light is increased by decreasing the transparency of the dynamic diffuser in the rest area of the inspection object corresponding to the bezel, thereby quickly and accurately performing the inspection. The aforementioned description is just an example and the present disclosure is not limited thereto.

The processor 110 recognizes the inspection object and then determines a transparency state required for the inspection among a state in which the transparency of the dynamic diffuser is low, a state in which the transparency of the dynamic diffuser is high, or a state having an arbitrary transparency therebetween to control the dynamic diffuser. The transparency state required for the inspection may include one or more states. Specifically, the processor 110 may inspect the defect of the surface of the inspection object only with one transparency state according to the transparency state required for the inspection. Further, when the processor 110 determines that it is necessary to compare images after photographing in the low transparency state and the high transparency state according to the transparency state required for the inspection, image data photographed in transparency states of different dynamic diffusers may be compared with each other. Further, the processor may perform an operation of controlling the dynamic diffuser 300 with any one of the low transparency state, the high transparency state, or the arbitrary transparency state therebetween a plurality of numbers of times and compare the image data photographed in the respective states.

The processor 110 may determine whether there is the defect in the inspection object from the image data including the inspection object surface. The processor 110 may determine whether there is the defect in the inspection object by processing the image data for the inspection object based on a deep learning based model. The processor 110 may input the image data into the deep learning based model and determine whether there is the defect in the inspection object by using the deep learning based model. Further, the processor 110 may include a classification result of the defect which exists on the inspection object surface from the image data by using the deep learning based model.

In an exemplary embodiment of the present disclosure, the deep learning based model stored in the memory 120 may be a model learned to perform classification, detection, segmentation, etc., for input image data. The model may be learned by a scheme of supervised learning or unsupervised learning for the image data.

The processor 110 may input the image data through the deep learning based model and output whether the defect exists in the input image of the inspection object. The processor 110 may classify whether there is the defect and the type of defect by using the deep learning based model. For example, whether the type of defect is the scratch or the dent may be classified. When the processor 110 outputs whether there is the defect and determines that there is the defect, the processor 110 may display a corresponding defect location to a bounding box through detection. When the processor 110 determines whether there is the defect and determines that there is the defect by using the deep learning based model learned for a purpose for providing a segmentation result, the processor 110 distinguishes a pixel of an area having the defect and pixels of other areas from each other to display the location of the defect on output image data.

As described above, the processor 110 inputs the image data of the inspection object into the deep learning based model and obtains an output indicating whether there is the defect, and as a result, in the present disclosure, the visibility of the defect of the inspection object surface may be secured regardless of complexity of the image, thereby increasing a defect recognition rate.

In an exemplary embodiment of the present disclosure, the processor 110 may determine the defect of the inspection object included in one or more image data according to the transparency of the dynamic diffuser by using one or more sub models of the deep learning based model. Specifically, one or more sub models may be deep learning based models separately learned according to the state of the dynamic diffuser. That is, since the diffusion degree of the light transmitted to the inspection object varies depending on the transparency of each dynamic diffuser, a deep learning based sub model optimized to each diffusion degree of the light may be used. The processor may output whether there is the defect depending on the transparency of the dynamic diffuser for each model by using the sub model. The processor may calculate whether there is the defect by using the sub model and then simultaneously display whether there is the defect in the image data of the inspection object to generate one output data. In a specific exemplary embodiment, when the processor does not diffuse light transmitted by the transparency of the dynamic diffuser, the processor inputs acquired non-diffused light image data into a first sub model of the deep learning based model to determine the defect of the inspection object included in the image data and when diffusing the light transmitted by the transparency of the dynamic diffuser, the processor inputs the acquired diffused light image data into a second sub model of the deep learning based model to determine the defect of the inspection object included in the image data.

As described above, even though the edge field optical system (see FIG. 3B) has a useful aspect for the surface defect of the inspection object 10 having the glossy surface, a reason that the edge field optical system may not be used in the existing industrial site is that whether there is the defect may not be easily derived by the existing image processing system because the complexity of the image is high. Therefore, the present disclosure has an effect that the image data for the edge field and the deep learning based model are combined to quickly and easily inspect the defects of more various objects surfaces. Hereinafter, in a state in which the processor 110 of the defect inspection device 100 according to an exemplary embodiment of the present disclosure controls the transparency of the dynamic diffuser 300 included in the lighting system 200 to maintain the diffusion degree of the light passing through the dynamic diffuser 300 to be low (see FIGS. 5A, 6A, and 7A), i.e., on the premise that there is an area including a rapid change of illuminance on the surface of the inspection object 10 transmitted by the light by the lighting system 200, an additional control of the processor 110 and the resulting effect will be described.

Figure 17:
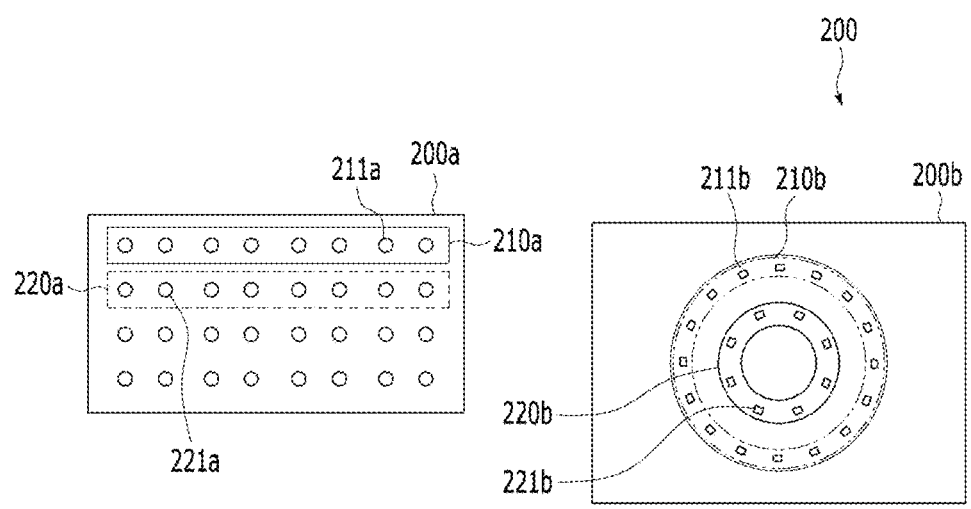
FIG. 17 is a diagram illustrating a configuration of a plurality of light sources included in a lighting system applied to a defect inspection device according to an exemplary embodiment of the present disclosure.

The processor 110 may obtain image data including a lighting pattern transmitted by the lighting system 200 on the surface of the object. The processor 110 may obtain the image data from the photographing unit 140 photographing the surface of the inspection object. Alternatively, the processor 110 may obtain image data stored in the memory 120 or obtain image data transmitted from an external storage through the network 130. The image data may include a rapid change of illuminance in at least one area of the object surface by the transmitted lighting pattern. Hereinafter, the lighting system 200 used in the defect inspection device according to an exemplary embodiment of the present disclosure will be described with reference to FIG. 17. As an exemplary embodiment of the present disclosure, the lighting system may include a plurality of light sources and the plurality of light sources may be arranged at predetermined intervals. Further, the plurality of light sources of the lighting system may be arranged in a predetermined shape. The light source includes an incandescent lamp, a halogen lamp, a fluorescent lamp, an electrodeless lamp, a high-pressure sodium lamp, an LED lamp, and the like, and includes, without limitation, a light source that is lit according to the electric signal.

The predetermined interval refers to a distance between the light sources included in the lighting system. The predetermined interval may be determined according to a distance between edge fields to be formed on the surface of the inspection object. The predetermined shape means a shape represented by arrangement of two or more light sources included in the lighting system. The predetermined interval and the predetermined shape may be determined according to the characteristics of the inspection object. As a specific exemplary embodiment, the predetermined shapes of the plurality of light sources may be a checkerboard arrangement 200a in which at least one other light source is present on the top, bottom, left, and right of a specific light source or one or more light sources form circular or elliptical lines at regular intervals and the plurality of circular or elliptical lines may form a concentric relationship and may be spread on the same surface (200b). In the process of arranging the light sources in order to implement the predetermined shapes of the plurality of light sources, the predetermined interval may be determined according to a distance between required edge fields. Although not illustrated, as another exemplary embodiment, the plurality of light sources is arranged so that another light source is present only on a diagonal line from any one light source to form a lattice structure. Further, as an exemplary embodiment of the present disclosure, in order to project the edge field to the surface of the inspection object according to the predetermined intervals and shapes, the plurality of light sources may be distributed on planes forming a sphere, a rectangular parallelepiped, and side surface of a cylinder, a cone, etc., in a 3D coordinate system. The predetermined interval and the predetermined shape are examples of the present disclosure and the present disclosure includes arrangement of light sources for forming the edge field on the surface of the inspection object. When the lighting system includes the plurality of light sources according to the predetermined shapes and the predetermined intervals as described above, the lighting patterns required for inspecting the inspection object may be formed by a minimum number of light sources, and as a result, the cost is reduced.

The lighting system 200 according to an exemplary embodiment of the present disclosure may include the plurality of light sources and transmit different lighting patterns through controlling an operation of each of the plurality of light sources. Specifically, one arbitrary light source 211a, 221a, 211b, or 221b among the plurality of light sources in the lighting system may be individually lit. This means that individual light sources may be controlled regardless of the arrangement of the light source, and furthermore, through this, in addition to typical patterns (e.g., polygons, circles, straight lines, diagonal lines, etc.), it will be apparent to those skilled in the art from the disclosed contents of this specification that non-typical patterns (e.g., curve patterns having different radius of curvature) or a pattern in which several patterns are combined (e.g., a rectangular lighting pattern and a circular lighting pattern are simultaneously projected onto one object) may be created by considering features of the object surface or the shape of the object. Further, the individual control of each of the light source has an effect that even though the shape of the inspection object is continuously changed, the edge field is formed in a desired area of the object surface by controlling the light source of the lighting system 200 regardless of the continuous change to inspect the appearance defect.

The lighting system 200 according to an exemplary embodiment of the present disclosure may be constituted by a plurality of light sources configured in at least two groups. For example, the group of the light source may be configured in the form of the straight line (210a and 220a). Alternatively, when the respective light sources are connected by a virtual line, light sources forming the circle may constitute the group (210b and 220b). The group of the light source is just an example and the present disclosure is not limited thereto. When the light sources are controlled separately for each group as described, a lighting pattern of a desired shape may be projected to the object and further, even though each light source need not be individually controlled, so that there is an effect that cost for the control is reduced.

In an exemplary embodiment of the present disclosure, the lighting system in the defect inspection device may include the plurality of light sources and when the light sources are emitted, the number of edge fields per unit area in one area of the inspection object surface may be set differently from those in other areas. In other words, the density of the light source area 11 may be different for each area. Alternatively, the control of the plurality of light sources is performed differently for the light sources for each group or each individual light source to create the lighting pattern so that an illuminance change area (in the present disclosure, the edge field) including the rapid change of illuminance covers at least a part of the inspection object surface.

The reason for controlling the density of the edge field or creating the edge field in only a portion of the inspection object surface is that the edge field may be required or not required according to the surface characteristics of the inspection object. For example, when one area of the object surface is made of the glossy material, but the other area is made of the matte material, the defect inspection device 100 may increase inspection efficiency by forming the edge field in the glossy portion, and may transmit uniform light by using the diffuser for the other matte area or not transmit the light by turning off the light source for the other matte area in some cases. As another example, in the case of controlling the density of the edge field or creating the edge field in only a portion of the inspection object surface, inspection may need to be performed only in a specific portion of the inspection object surface. That is, the defect inspection has already been completed for the remaining areas and the defect occurs in a specific area of the object surface, so that the defect needs to be inspected again.

The lighting system may be operated so as to transmit the edge field only in a partial area or control the number of edge fields per unit area as described above, and as a result, total cost related to control cost and electricity cost may be reduced in an industrial site and efficiency of the inspection may be increased by concentrating resources on an area to be concentrated.

The lighting system 200 may be controlled to transmit lighting patterns having different illuminances for each area to the inspection object surface. Hereinafter, the lighting patterns which the lighting system 200 used in the defect inspection device according to an exemplary embodiment of the present disclosure forms on the surface of the inspection object 10 will be described.

Hereinafter, the lighting pattern will be described with reference to FIG. 18. In the lighting pattern, the plurality of light sources may be arranged at the predetermined interval and transmitted to the surface of the inspection object 10 through collective ON/OFF of all light sources. In the lighting pattern, in the lighting system in which the plurality of light sources are uniformly arranged at equal intervals, one or more light sources may be controlled along a line such as a linear, polygonal, a circular shape, etc., and transmitted to the surface of the inspection object 10.

Figure 18:
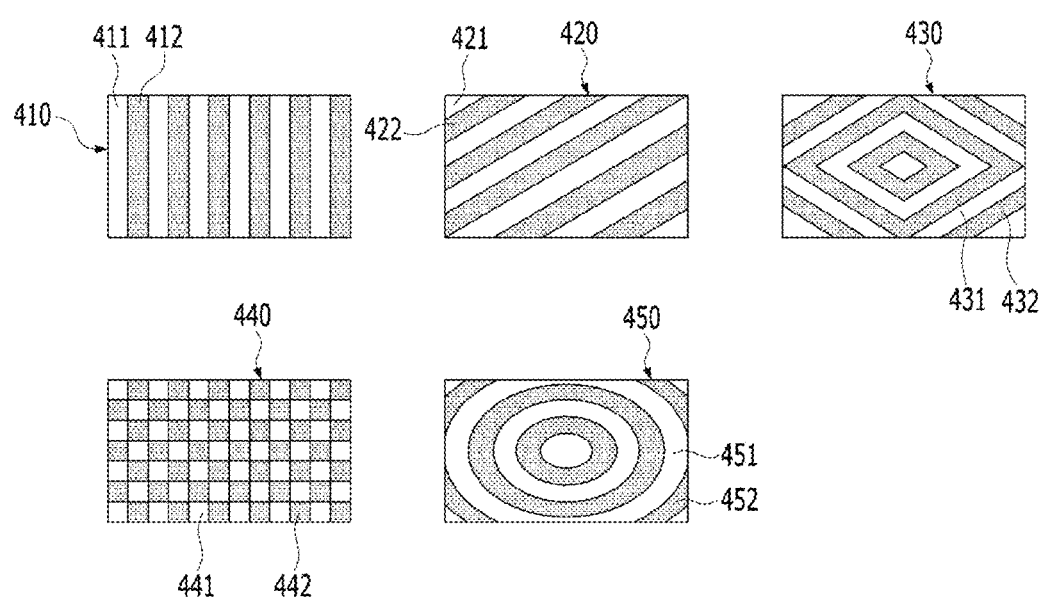
FIG. 18 is an exemplary diagram of a lighting pattern having different illuminances for each area transmitted to a surface of an inspection object by a lighting system of a defect inspection device according to an exemplary embodiment of the present disclosure.

In the example of FIG. 18, a dark field and a bright field are examples illustrating a group of light sources for constituting the lighting pattern. The linear lighting pattern may be a vertical line 410 or a horizontal line for the inspection object to which light sources 411 of a first group and light sources 412 of a second group are projected to cross each other. The light sources 411 of the first group and the light sources 412 of the second group may be controlled while mutually changing an emission state of the light source by the processor in order to create the lighting pattern on the inspection object surface. As an additional example of the lighting pattern, the light sources 421 of the first group and the light sources 422 of the second group may show a repetition pattern in the form of a diagonal line 420. Alternatively, the lighting pattern may be a polygon 430, a circle 450, etc., and when the group of the light sources is divided in a grid shape, the lighting pattern such as reference numeral 440 may be irradiated to the inspection object. However, the above example is not just an example and the present disclosure includes the above-described examples to form various patterns without limitation.

A width or interval of the lighting pattern may be implemented on the inspection object surface by controlling the plurality of light sources separately or for each group. Further, the width or interval of the lighting pattern may be implemented by changing a distance between the light source and the inspection object.

In the present disclosure, one of reasons that the defect such as the scratch, the step, the dent, etc., of the object having the surface made of the shiny or glossy material, the surface of the metal frame, or the surface of the mirror surface may be inspected by using the edge field is that since the defect surface reflects the light at a different reflection angle from a normal surface with respect to an incident angle, the defect may be inspected by detecting light scattered at such a different reflection angle.

Therefore, since the inspection device according to the present disclosure, which is capable of forming lighting patterns having different illuminances for each of many types of areas as described above variously modifies and utilizes the angle of the incident light, different reflection angles reflected on the defect surface may be detected as many as possible at various angles. This causes an effect of increasing the performance of the defect inspection device.

Meanwhile, since the defect on the surface of the object generally occurs in an arbitrary area, a probability of detecting the defect increases when as many areas of the surface as possible may be covered with the edge field while preventing the edge fields from overlapping with each other as much as possible.

Accordingly, the lighting system of the defect inspection device according to an exemplary embodiment of the present disclosure may transmit at least two different lighting patterns to the inspection object so that at least a part of the illuminance change area including the rapid change of illuminance does not overlap, and the photographing unit may acquire a plurality of image data for at least two different lighting patterns. Thereafter, the processor inputs the plurality of different image data into the deep learning based model to inspect whether there is the defect on the surface of the inspection object.

The edge field is transmitted to cover most of the surface area of the inspection object 10 to increase an inspectable area and increase the inspection efficiency.

Hereinafter, an exemplary structure of the lighting system used in the defect inspection device and an example of the resulting lighting pattern according to an exemplary embodiment of the present disclosure will be described with reference to FIGS. 19 and 20.

In an exemplary embodiment of the present disclosure, the lighting system of the defect inspection device may include a plurality of lighting plates on which the plurality of light sources are arranged and the plurality of lighting plates may be in a form in which a region is perforated so that at least a portion of a light transmitted from a lighting plate located on an upper layer may reach the surface of the inspection object.

Figure 19:
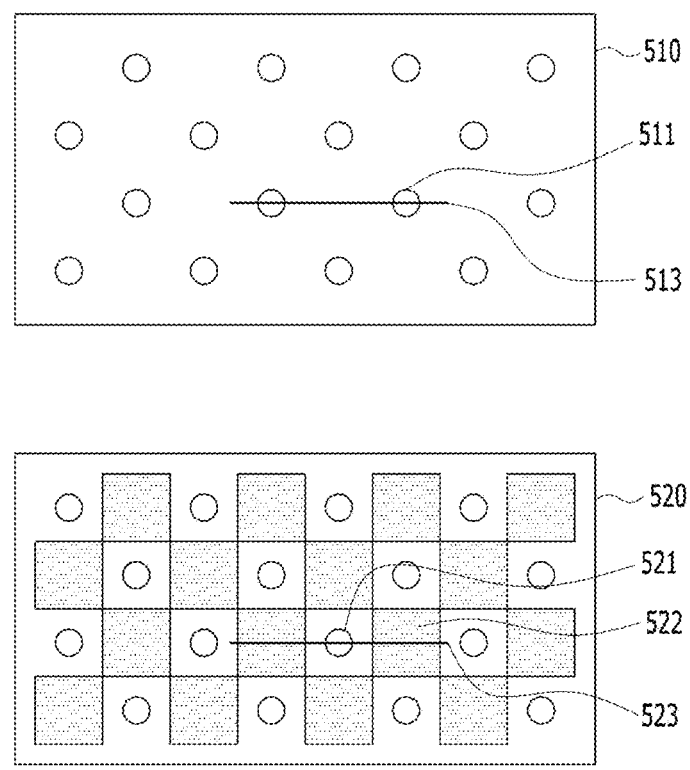
FIG. 19 is an exemplary diagram of a configuration of a lighting system applied to a defect inspection device according to another exemplary embodiment of the present disclosure.
Figure 20:
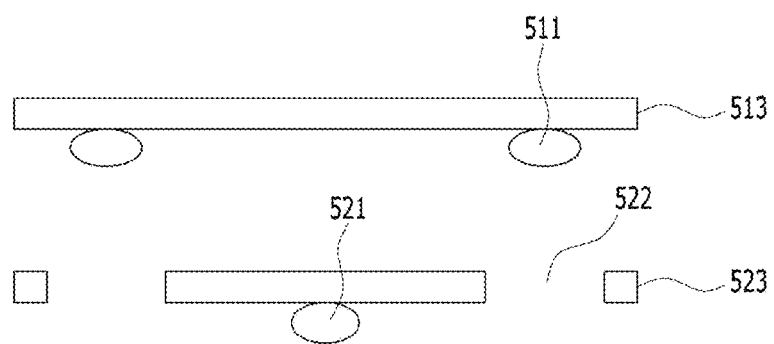
FIG. 20 is a cross-sectional view of a lighting system applied to a defect inspection device according to an exemplary embodiment of the present disclosure.

For a specific example, if there are two lighting plates, the two lighting plates include an upper lighting plate 510 of FIG. 19A and a lower lighting plate 520 of FIG. 19B. In this case, a plurality of light sources 511 of the upper lighting plate and a plurality of light sources 521 of the lower lighting plate may be located in the lighting plate while being spaced apart from each other so as not to overlap with each other when two lighting plates overlap with each other. In addition, an area 522 corresponding of the lower lighting plate corresponding to the light source of the upper lighting plate has a perforated form so that the lower lighting plate 520 does not cover the light source 511 of the upper lighting plate. In FIG. 19, a cross section 513 of the upper lighting plate and a cross section 523 of the lower lighting plate are used for describing cross sections when the upper and lower lighting plates overlap with each other, respectively. A side view of the cross section of the overlapped lighting plate is disclosed in FIG. 20. As can be seen in FIG. 20, a corresponding portion of the lower lighting plate is constituted by a perforated area 522 so that the lower lighting plate does not cover the light source 511 of the upper lighting plate. In addition, when the inspection device is used, the inspection device may be used in a form in which the lower lighting plate may be turned off when the light source of the upper lighting plate is turned on and the lower lighting is turned on when the light source of the upper lighting plate is turned off in order to form lighting patterns having different illuminances for each area on the inspection object surface. A grid-shaped perforation pattern shown on the lower lighting plate is just an example, and it will be apparent to those skilled in the art that a plurality of lighting plates overlap with each other to create various patterns including linear, circular, and polygonal shapes, etc., without limitations according to modification of a perforation pattern.

As described above, the effect of the present disclosure that may be obtained by overlapping the plurality of lighting plates is that the lighting patterns having illuminances for each area on the inspection object surface may be created only through the control of each lighting plate without the control for a specific light source group or the control for each of the plurality of light sources. In other words, since it is possible to create different lighting patterns while collectively controlling the plurality of light sources included in individual lighting plates, there may be an effect of lowering the control cost and facilitating the operation.

The processor 110 may obtain image data for each of different lighting patterns transmitted by the lighting system. For example, there may be a plurality of image data for each of different lighting patterns with respect to one inspection object. The processor 110 may determine the defect of the inspection object based on the plurality of image data including different lighting patterns.

The processor 110 may determine whether there is the defect in the inspection object from the image data including the inspection object surface. The processor 110 may determine whether there is the defect in the inspection object by processing the image data for the inspection object based on a deep learning model. The processor 110 may input the image data into the deep learning based model and determine whether there is the defect in the inspection object based on the deep learning based model. Further, the processor 110 may include a classification result of the defect which exists on the inspection object surface from the image data by using the deep learning based model.

Figure 21:
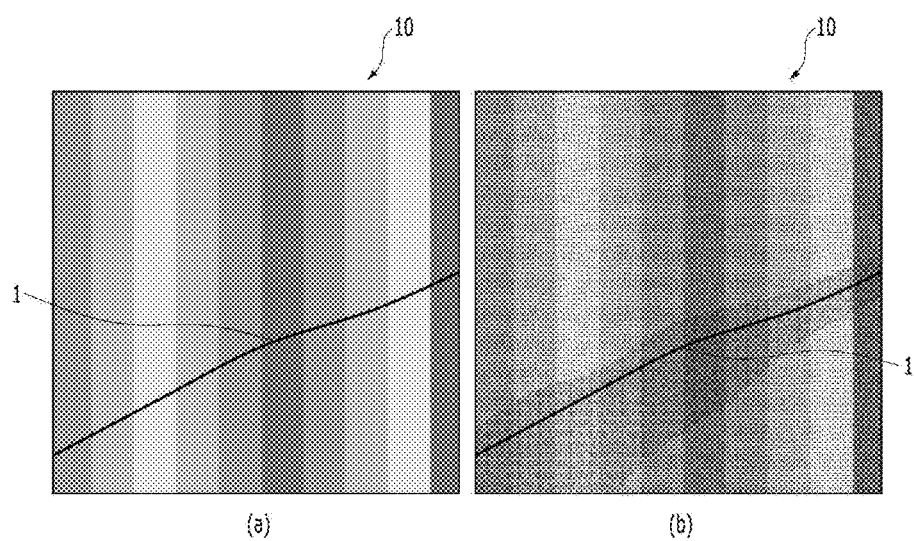
FIG. 21 is an exemplary diagram illustrating that a defect inspection device marks a location of a defect which exists in an inspection object according to an exemplary embodiment of the present disclosure.

FIG. 21 is an exemplary diagram illustrating detection and a location of a defect which exists in the inspection object 10 from the image data including the surface of the inspection object 10 by the processor 110. When there is the defect in the inspection object 10, the processor 110 may determine that there is the defect and output the location of the defect which becomes a basis of the determination. That is, when there is a scratch type defect 1 on the surface of the inspection object 10 as illustrated in FIG. 21A, the processor 110 may display the location of the defect 1 as a visual expression (e.g., color, etc.) that may be distinguished from other areas determined to be normal by using the deep learning based model.

In an exemplary embodiment of the present disclosure, the processor 110 may extract only an edge field portion of the image data and input the extracted edge field portion into the deep learning based model. The processor 110 may divide the image data into patches and extract the edge field based on a pixel value for each pixel of the patch. For example, the processor 110 acquires an illuminance value per pixel by referring to an RGB value of each pixel in the obtained image data. This may be acquired as an absolute value by comparing an actual RGB value and a color table and acquired as a relative value by deriving an average and a variance of RGB values of all pixels. Further, the processor 110 may extract only the edge field portion based on meta information indicating the edge field portion in the image data.

When a pixel located at the center of a 3×3 matrix has a higher illuminance value than surrounding pixels in order to select pixels that become the center of the edge field based on the illuminance value per pixel, the processor 110 may select the corresponding pixel as the pixel that becomes the center of the edge field. In addition, the edge field may be extracted by using a predetermined distance of the edge field with the pixel as the center of the light source. In another exemplary embodiment, in a process of selecting the pixel that becomes the center of the edge field, the corresponding pixel may be selected by finding a maximum value of the illuminance value by using the illuminance value of each pixel as a separate axis on 2D image data. In addition, a pixel having an illuminance value of a specific threshold or more may be selected instead of the maximum value and the maximum value may be selected in a wider N×N matrix.

In another embodiment, the processor 110 may extract a plurality of edge field patches and then compare areas including respective patches, and when the number of areas where the patches overlap with each other is equal to or more than a predetermined number, the processor 110 may select only some patches.

In an exemplary embodiment of the present disclosure, the processor 110 may input meta data containing information on a portion where the rapid change of the illuminance occurs into the deep learning based model in order to emphasize the portion where the rapid change of the illuminance occurs together with the image data. The processor 110 may input location information of the edge field into the deep learning based model together with the image data. Specifically, the processor 110 may acquire an illuminance value per pixel by referring to an RGB value of each pixel in the obtained image data. In addition, the processor may calculate a difference in illuminance value between pixels separated by an arbitrary distance in a direction orthogonal to a direction of a boundary line of the lighting pattern transmitted to the inspection object. If the lighting pattern has a circular shape 450, a difference in illuminance values between pixels separated by a predetermined distance along a line extending radially from the center of the light source area at the center of the image data may be calculated. The difference in the illuminance value may be a simple subtraction or may be a slope obtained by dividing the difference in illuminance value between pixels by the predetermined distance. The processor may select the pixel in the area in which the rapid change of illuminance appears based on the difference in the illuminance value. In addition, information on the pixel may be input into the deep learning model together with the image data. An example of the lighting pattern and the resulting orthogonal direction is just an example, and the present disclosure is not limited thereto.

When only the edge field portion is extracted from the image data and input into the deep learning based model or the meta data for emphasizing the area where the rapid change of the illuminance occurs is input into the deep learning based model together with the image data as described above, the processor just performs an operation for determining whether there is the defect only for the extracted edge field or in the vicinity of the emphasized pixel without searching all image data, and as a result, there is an advantage in that an operation processing speed increases while computing resources are consumed less.

In an exemplary embodiment of the present disclosure, the processor 110 may perform a separate operation to cover an area of a predetermined area or more among the entire area of the surface of the inspection object with the edge field. That is, when the sum of the areas of the plurality of different areas covered by the edge field among the total area of the surface of the inspection object is less than a threshold, the processor 110 may allow the lighting pattern for deriving the rapid change of the illuminance to be transmitted to other areas of the surface of the inspection object in order to create the edge field in an area not previously covered by controlling the lighting system. For example, if the set threshold is set to 100% to inspect the entire surface of the inspection object, the processor 110 performs an operation of extracting the edge field and then when determining that the sum of the areas of the extracted edge field area may not cover the entire surface of the inspection object, the processor 110, may allow the lighting patterns to be transmitted to different areas by controlling the lighting system, and re-extract the edge field by receiving the image data from the photographing unit 140 again. Such re-input and re-extraction processes may be performed a plurality of numbers of times according to the set threshold. As another exemplary embodiment, when the processor controls the lighting system so as to transmit a lighting pattern different from the previous pattern, the processor may control the lighting system so that the rapid change of illuminance occurs in other areas other than the area already covered with the edge field on the surface of the inspection object. In general, since the defect in appearance occurs in an arbitrary area on the surface of the inspection object, if the processor 110 may inspect the surface of the inspection object at least as large as coverage of a set threshold or more, there is an advantage in that the detection probability of the surface defect may be increased.

In an exemplary embodiment of the present disclosure, the processor 110 obtains a plurality of image data by transmitting different lighting patterns to the inspection object and inputs the obtained image data into the deep learning based model to determine the defect of the surface of the inspection object. As a specific exemplary embodiment, the processor 110 may create one image data by overlapping the plurality of image data for each pixel and then input the created image data into the deep learning based model. In another exemplary embodiment, the plurality of image data are sequentially input into the same model and a location having the defect is sequentially checked and then all image data may be finally displayed in one output image. In an additional exemplary embodiment, in respect to the plurality of image data, image data including a corresponding lighting pattern is input for each sub model learned for each lighting pattern to separately output the defect location under each lighting pattern.

Depending on the surface of the inspection object, when the incident angle of the transmitted light reaches a specific angle, the defect of the surface may be better detected. For example, if the surface of the inspection object includes multiple thin grooves having a very small width in the form of the circular shape and is made of the glossy material, a circular lighting pattern may be more effective in order to detect the scratch of such a surface. Therefore, when the defect of the surface of the inspection object is inspected by using different lighting patterns as described above, the defect of the appearance may be inspected by changing the incident angle of the light differently, and as a result, the detection probability increases. Further, when the processor redundantly inspects the plurality of image data depending on different lighting patterns, there is an effect that the inspection speed increases. On the contrary, when the output data are obtained by inputting the plurality of image data into the same model according to a separate model or sequentially, accuracy of the defect inspection may be increased. As described above, the processor 110 inputs the image data of the inspection object including the edge field into the deep learning based model and obtains outputs having various types of forms, and as a result, in the present disclosure, the visibility of the defect of the inspection object may be secured regardless of complexity of the image, thereby increasing a defect recognition rate.

The processor 110 included in the defect inspection device according to the exemplary embodiment of the present disclosure may include a process of extracting the illuminance change region including the rapid change of illuminance from the input image data again. A preprocessing process of extracting the illuminance change region from the input image data is included as described above to reduce an error that the processor determines that there is the defect from areas other than the object on the image, i.e., a background image, and performs the inspection by extracting only a region of interest from the entire image data, and as a result, a data processing speed may increase.

Throughout this specification, the deep learning based model, the computation model, the neural network, a network function, and the neural network may be used as the same meaning. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean not the initial input node and the final output node but the nodes constituting the neural network.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to yet another exemplary embodiment of the present disclosure, the number of nodes of the input layer may be larger than the number of nodes of the output layer, and the neural network may be a neural network of a type in which the number of nodes increases from the input layer to the hidden layer. The neural network according to still yet another exemplary embodiment of the present disclosure may be a neural network of a type in which the neural networks are combined.

A deep neural network (DNN) may refer to a neural network that includes a plurality of hidden layers in addition to the input and output layers. When the deep neural network is used, the latent structures of data may be determined. That is, potential structures of photos, text, video, voice, and music (e.g., what objects are in the picture, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output (category) of the neural network with the label of the learning data. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network) of actual data, and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

Figure 22:
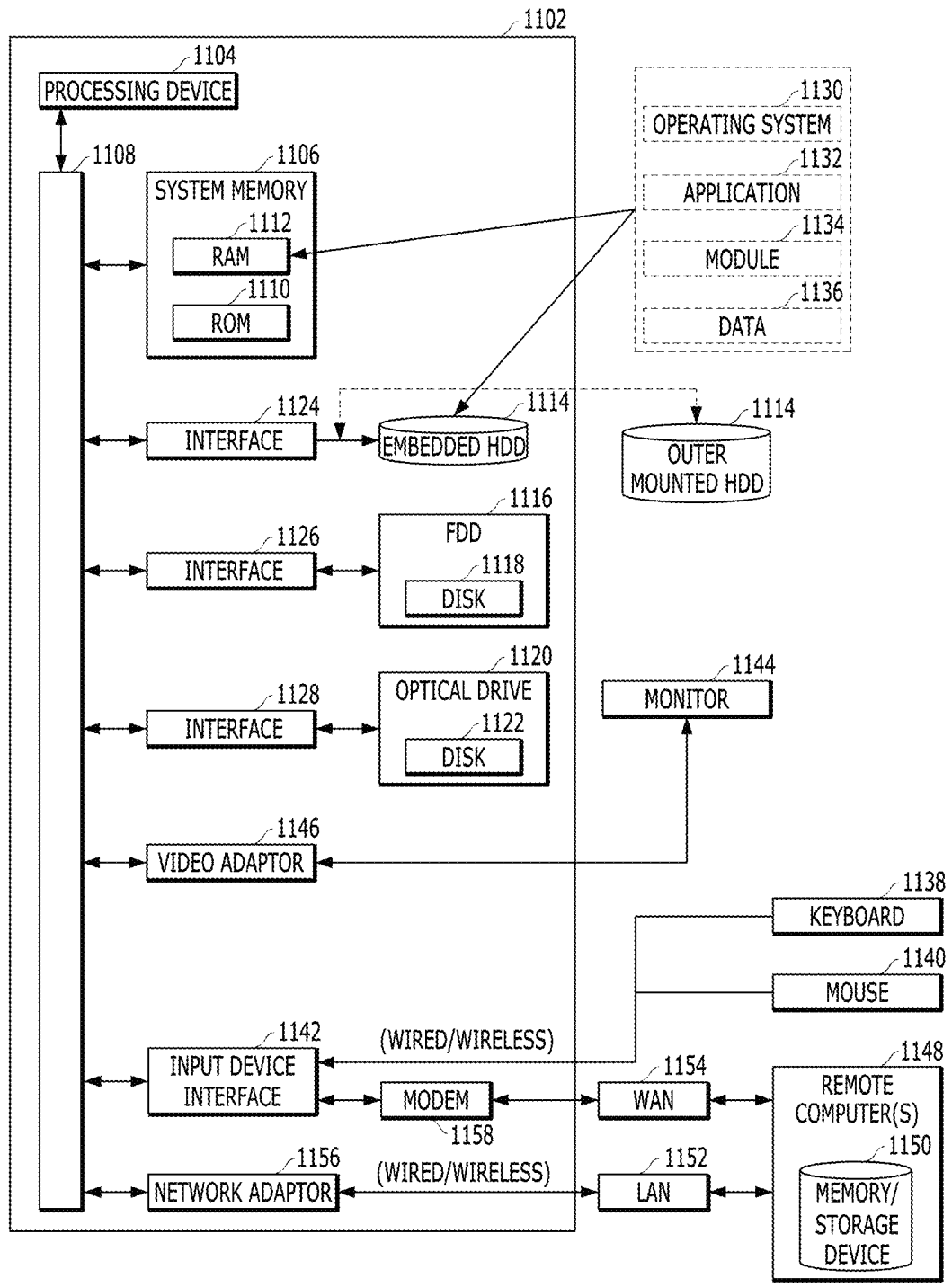
FIG. 22 is a block diagram of a computing device according to an exemplary embodiment of the present disclosure.

FIG. 22 is a normal and schematic view of an exemplary computing environment in which the exemplary embodiments of the present disclosure may be implemented.

It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, temporary and non-temporary media, and movable and non-movable media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by configuring or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11 (a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, an apparatus, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the embodiments presented herein, but should be interpreted within the widest range which is coherent with the principles and new features presented herein.

What is claimed is:

1. A defect inspection device including:
a lighting system designed for transmitting a lighting pattern having different illuminances for each area on a surface of an inspection object;
a photographing unit for obtaining an image data of the inspection object;
one or more processors for processing the image data; and
a memory for storing a deep learning-based model;
wherein the one or more processors are adapted to:
control, the lighting system to transmit a lighting pattern having a different illuminance for each area on the surface of the inspection object, each area on the surface of the inspection object having an edge field with an illuminance change area;
input, an image data obtained by the photographing unit into the deep learning-based model, wherein the image data includes the illuminance change area of the edge field in at least a part of the surface of the inspection object; and
determine, a defect on the surface of the inspection object using the deep learning-based model.

2. The defect inspection device of claim 1,
wherein the lighting system includes a plurality of light sources, and wherein the plurality of light sources are arranged at predetermined intervals in the lighting system.

3. The defect inspection device of claim 1,
wherein the lighting system includes a plurality of light sources, and transmits a lighting pattern having different illuminances for each area on the surface of the inspection object by controlling an operation of each of the plurality of light sources.

4. The defect inspection device of claim 1,
wherein the lighting system includes a plurality of light sources comprising at least two groups.

5. The defect inspection device of claim 1,
wherein the lighting system includes a plurality of light sources, and when the light sources emit light, a first number of edge fields per unit area on one area of the surface of the inspection object and a different second number of edge fields per unit area of at least one other area of the surface of the inspection object.

6. The defect inspection device of claim 1,
wherein the lighting pattern is configured such that the illuminance change area, where a rapid change of illuminance occurs, covers at least a part of the surface of the inspection object.

7. The defect inspection device of claim 1,
wherein the lighting system includes a plurality of light sources, and the plurality of light sources are controlled by the one or more processors to emit the lighting pattern in a linear, polygonal, or circular pattern.

8. The defect inspection device of claim 1,
wherein the image data inputted to the deep learning-based model includes a plurality of images obtained under different lighting patterns to determine the defect on the surface of the inspection object.

9. The defect inspection device of claim 1,
wherein the lighting system comprises a plurality of lighting plates on which a plurality of light sources are arranged, and
wherein the plurality of lighting plates are in a form in which a region is perforated so that at least a portion of a light transmitted from a lighting plate located on an upper layer can reach the surface of the inspection object.

10. The defect inspection device of claim 1, wherein the one or more processors are further adapted to extract the illuminance change area in which illuminance rapidly changes from the image data.

11. A non-transitory computer readable medium storing a computer program, wherein the computer program comprising instructions for causing one or more processors to perform the method, the method comprising:
controlling a lighting system to transmit a lighting pattern having a different illuminance for each area on a surface of an inspection object, each area on the surface of the inspection object having an edge field with an illuminance change area;
inputting an image data obtained by a photographing unit into a deep learning-based model, wherein the image data includes the illuminance change area of the edge field in at least part of the surface of the inspection object; and
determining a defect on the surface of the inspection object using the deep learning-based model.

12. A method for inspecting defect on a surface of an inspection object, the method comprising:
controlling a lighting system to transmit a lighting pattern having a different illuminance for each area on a surface of an inspection object, each area on the surface of the inspection object having an edge field with an illuminance change area;
inputting an image data obtained by a photographing unit into a deep learning-based model, wherein the image data includes the illuminance change area of the edge field in at least a part of the surface of the inspection object; and
determining a defect on the surface of the inspection object using the deep learning-based model.

13. The defect inspection device of claim 1, wherein the one or more processors are further adapted to extract the edge field from the image data.

14. The defect inspection device of claim 1, wherein the one or more processors are further adapted to extract the edge field from the image data and input the extracted edge field into the deep learning-based model.

* * * * *